United States Patent [19]
Levins et al.

[11] Patent Number: 5,583,743
[45] Date of Patent: Dec. 10, 1996

[54] APPLIANCE HOUSING AND SPEAKERS MOUNTED THERETO

[75] Inventors: James K. Levins, Santa Clara; Steven B. Chase, Cupertino, both of Calif.

[73] Assignee: Apple Computer, Inc., Cupertino, Calif.

[21] Appl. No.: 415,467

[22] Filed: Apr. 3, 1995

[51] Int. Cl.$^6$ .............................. H05K 5/00; A47B 81/06
[52] U.S. Cl. .................. 361/683; 248/917; 312/223.2; 181/199
[58] Field of Search .................. 361/679, 681–683; 248/917, 918; 312/7.2, 8.16, 223.1–223.3; 348/787–794, 825–844; 181/199

[56] References Cited

U.S. PATENT DOCUMENTS

| | | | |
|---|---|---|---|
| 3,575,370 | 4/1971 | Morris et al. | 248/201 |
| 4,644,408 | 2/1987 | Coleman | 348/836 |
| 5,166,802 | 11/1992 | Thiele et al. | 348/836 |

*Primary Examiner*—Leo P. Picard
*Assistant Examiner*—Jayprakash N. Gandhi
*Attorney, Agent, or Firm*—Burns, Doane, Swecker & Mathis, L.L.P.

[57] ABSTRACT

An appliance such as a personal computer includes an outer housing, including a front bezel which frames a monitor screen of the computer. The bezel carries speakers which are secured to the bezel by snap arms that are integrally molded with the bezel from a plastic material. The bezel also includes locator pins which engage locator holes of the speakers, and ribs which engage the speakers to resist speaker vibration.

16 Claims, 4 Drawing Sheets

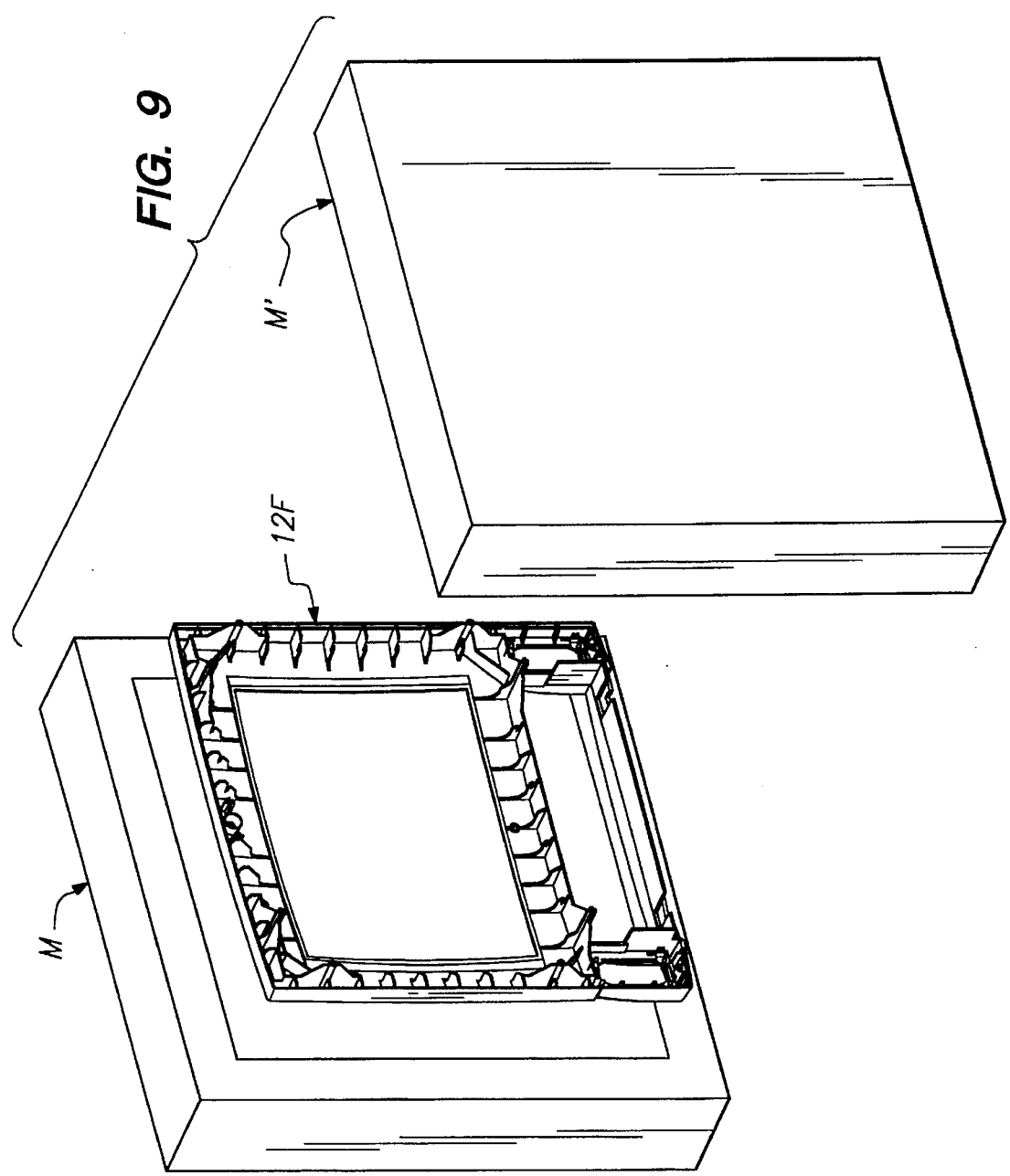

APPLIANCE HOUSING AND SPEAKERS MOUNTED THERETO

BACKGROUND OF THE INVENTION

The present invention relates to appliances having an outer housing, with speakers mounted to the housing.

Appliances, such as televisions and personal computers, for example, include a monitor encased within an outer housing, formed for example of plastic, with speakers mounted within the housing. It has been conventional to provide a panel of the housing with sound-admitting openings, and to mount the speakers to an inner side of the housing panel in alignment with respective openings.

The speakers have typically been attached to the panel by means of screw fasteners. However, the installation of screw fasteners is time consuming and increases the overall manufacturing costs. It would be desirable to enable speakers to be mounted quickly with a minimum of effort, and without unduly complicating the molding of the plastic housing section.

SUMMARY OF THE INVENTION

One aspect of the present invention relates to the combination of an appliance, such as a personal computer, having a housing and a speaker mounted to a section of the housing. The housing section has a sound-admitting portion which includes an opening extending from an outer side to an inner side of the housing section. The inner side includes a fulcrum structure, such as a notch, disposed adjacent one section of the sound-admitting portion, and a snap arm disposed adjacent another section of the sound-admitting portion. The snap arm includes a main portion projecting away from the inner side of the housing section, and a locking finger projecting toward the inner side from an end of the main portion. The locking finger includes a contact surface facing generally away from the inner surface. The snap arm is elastically flexible toward and away from a center axis of the opening of the sound-admitting portion. The speaker includes a base having a first edge mountable on the fulcrum structure to form a fulcrum about which an opposite edge of the base can pivot toward and away from the inner surface. The base of the speaker is engageable with the contact surface of the snap arm to elastically deflect the snap arm during travel of the opposite edge toward the housing section.

The snap arm is preferably of one piece molded construction with the housing section, the housing section and snap arm being formed of plastic.

The housing section preferably includes locator pins projecting from the inner side thereof. The speaker includes locator holes for receiving the locator pins.

Preferably, the housing section includes elongated ribs extending from the inner side thereof. The speaker abuts those ribs to minimize speaker vibration.

The invention also relates to the housing section per se comprising a plastic body which includes a sound-admitting portion including an opening extending from an outer side to an inner side of the body, and a flexible snap arm disposed adjacent the sound-admitting portion. The snap arm includes a main portion projecting away from the inner side, and a locking finger projecting toward the inner side from an end of the main portion. The locking finger includes a contact surface facing generally away from the inner surface, enabling the snap arm to be elastically flexed toward and away from a center axis of the opening of the sound-admitting portion. The snap arm is adapted to secure a speaker to the body.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 9 is a perspective schematic view of two mold halves for forming a bezel according to the present invention.

DETAILED DESCRIPTION OF PREFERRED EMBODIMENTS OF THE INVENTION

Figure 1:
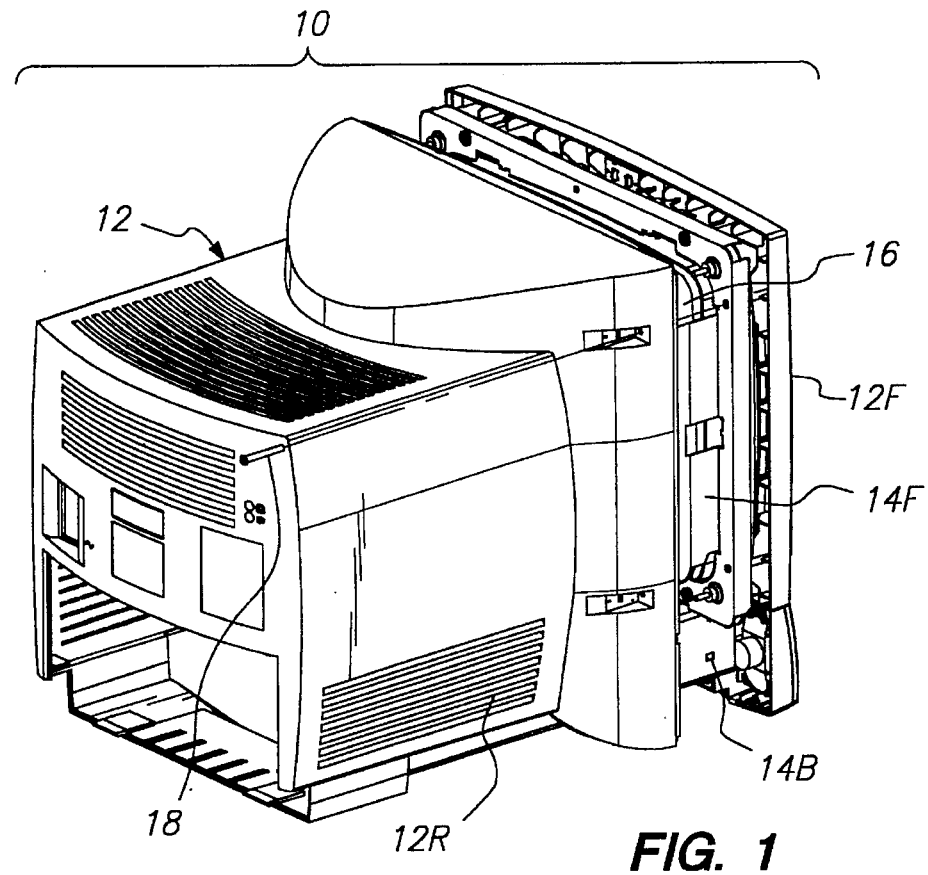
FIG. 1 is an exploded rear perspective view of a personal computer according to the present invention.

A personal computer 10 depicted in FIG. 1 comprises an outer housing 12 and a metal chassis 14 mounted within the outer housing, the chassis 14 carrying a monitor 16. The housing 12 comprises front and rear portions 12F, 12R interconnected by screws 18.

Figure 2:
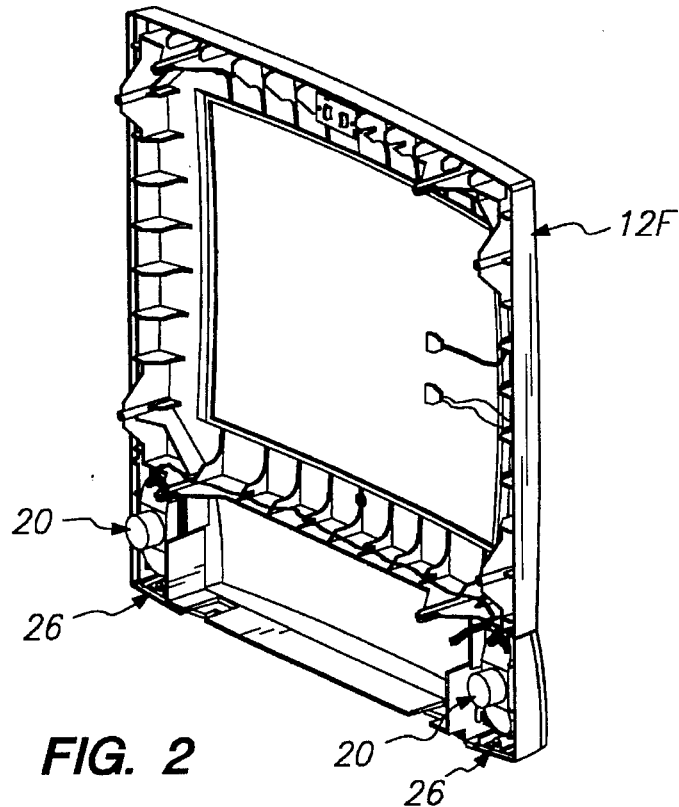
FIG. 2 is a rear perspective view of a front bezel section of a housing of the computer depicted in FIG. 1, with two speakers mounted therein.
Figure 3:
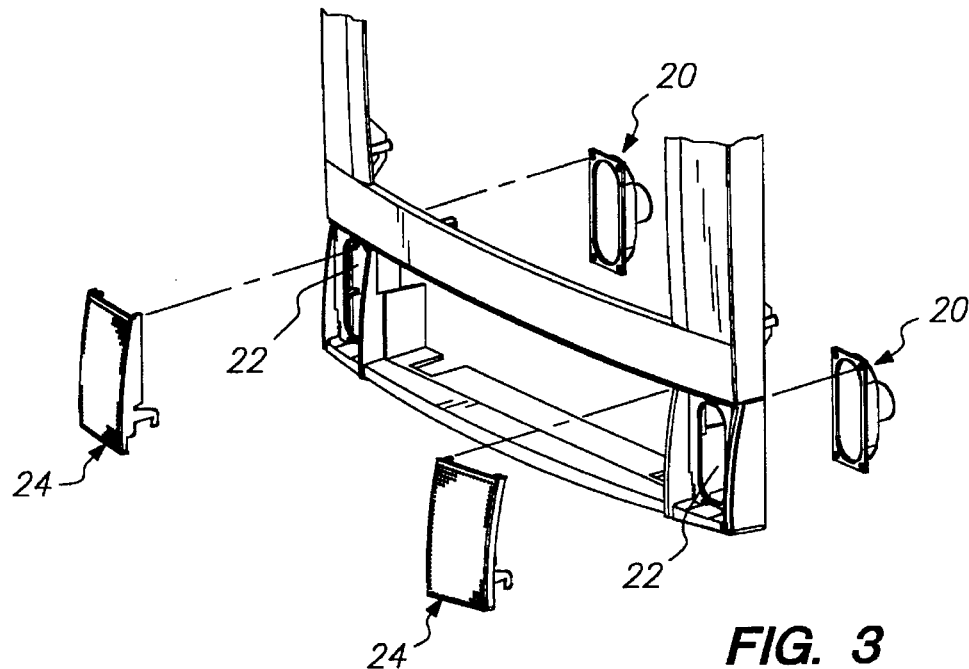
FIG. 3 is an exploded front perspective fragmentary view of the bezel depicted in FIG. 2.
Figure 4:
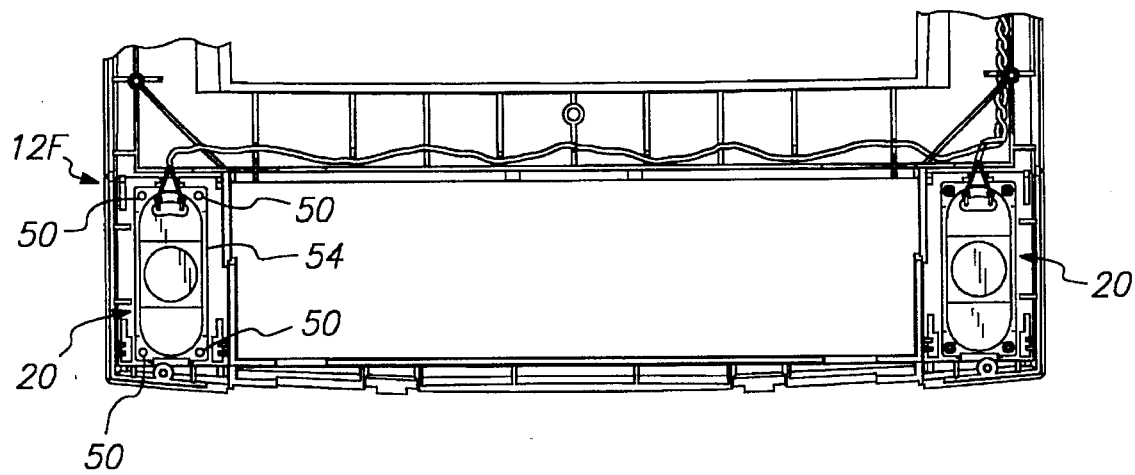
FIG. 4 is a fragmentary rear elevational view of the bezel depicted in FIG. 2.

The housing front portion 12F is in the form of a bezel that is shown from the rear in FIG. 2. Disposed at a bottom portion of the inner or rear side of the bezel are two pockets 26 in which two speakers 20, 20 are mounted. Each speaker emits sound through a sound-emitting portion in the form of an opening 22 in the bezel as shown in FIG. 3. The speakers 20 and openings 22 are covered by speaker covers 24 which snap into place from the front or outer side of the bezel as shown in FIG. 3.

Figure 5:
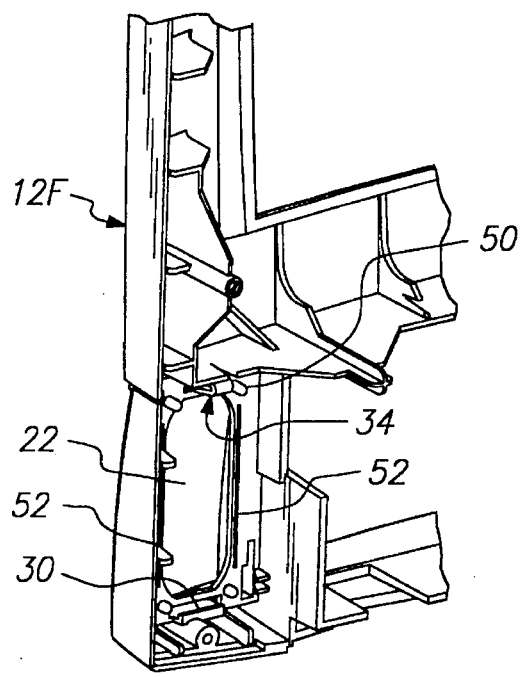
FIG. 5 is a fragmentary perspective view of the bezel, with a speaker removed therefrom to expose a speaker mounting pocket of the bezel.
Figure 6:
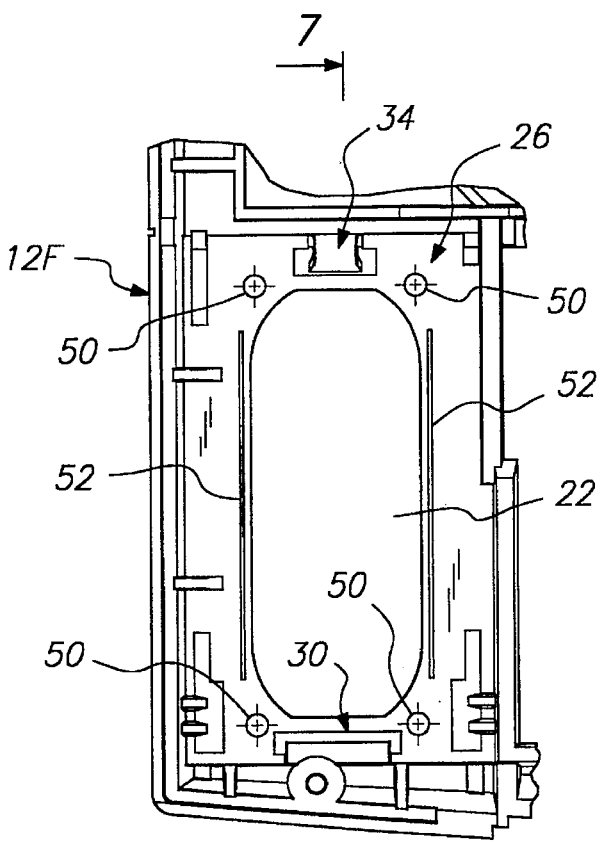
FIG. 6 is a rear elevational view of the speaker mounting pocket depicted in FIG. 5.
Figure 7:
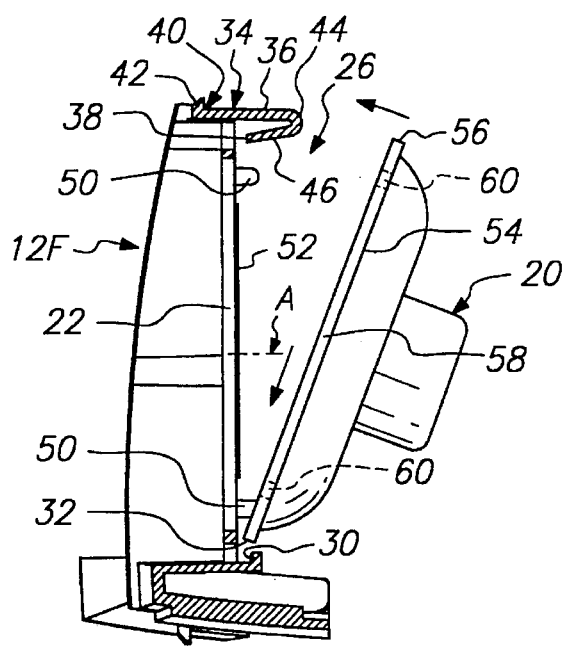
FIG. 7 is a sectional view taken along the line 7—7 of FIG. 6 with a speaker in the process of being mounted in the speaker-receiving pocket.

The right and left speaker-receiving pockets 26 are mirror images of one another so only one will be described in detail. The speaker-receiving pocket 26 for the right-hand speaker is depicted in FIGS. 5, 6 and 7. The pocket includes a fulcrum structure in the form of a lower notch 30 for receiving a lower edge 32 of the speaker, that notch 30 being situated beneath the associated opening 22. Disposed above the opening 22 is a snap arm 34 which includes a rearwardly projecting main portion 36, a rear end of which is reverse-bent to extend forwardly to form a locking finger 38. The main portion 36 is adapted to flex up and down about an axis 40 formed by a junction of the main portion 36 and the adjacent wall 42 of the bezel. Also, the locking finger 38 is adapted to flex up and down about an axis 44 defined by the junction between the main portion 36 and the locking finger 38.

The locking finger 38 is inclined slightly downwardly and forwardly so that the rear surface 46 thereof faces somewhat rearwardly and constitutes a contact surface that functions like a cam follower as will later be explained.

Disposed adjacent the opening 22 are four rearwardly projecting locator pins 50 and two narrow ribs 52 for reasons to be explained below.

The speakers 20 are identical, each including a rectangular base 54. The base includes the aforementioned lower edge 32, and also includes an upper edge 56 and two vertical side portions 58 extending between the upper and lower edges 56, 32. Formed in the base 54 adjacent respective corners thereof are locator holes 60 sized to receive the locator pins 50.

Figure 8:
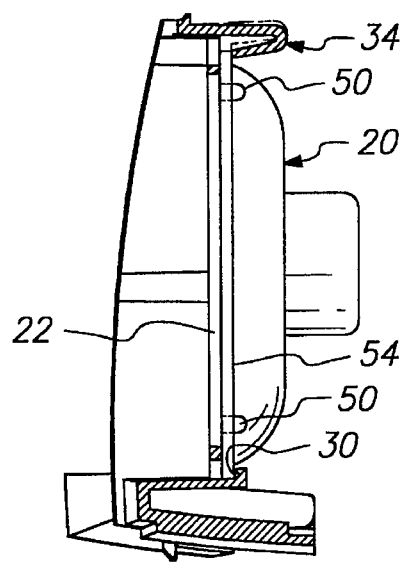
FIG. 8 is a view similar to FIG. 7 after the speaker has been mounted in the speaker-receiving pocket.

In order to install a speaker 20, the lower edge 32 of the speaker is inserted into a respective notch 30 as shown in FIG. 7, and the speaker is then pivoted forwardly about the lower edge as a fulcrum until the upper edge 56 contacts the contact surface 46 of the snap arm 34. Upon further forward pivoting of the speaker, the upper edge 56 causes the snap arm to be elastically deflected upwardly away from a center axis A of the opening 22, i.e., the main portion 36 pivots upwardly about axis 40 and/or the locking finger 38 pivots upwardly about its axis 44 (see the broken lines in FIG. 8). This enables the upper edge 56 of the base to travel forwardly past the front tip of the locking finger 38, whereafter the snap arm 34 snaps downwardly to capture the speaker as shown in solid lines in FIG. 8.

As that occurs, the locator holes 60 of the base receive the locator pins 50 of the bezel to vertically and horizontally locate the speaker. Also, the vertical side portions of the speaker base, which are relatively soft, are pushed against the respective ribs 52 of the bezel to ensure that the speaker base firmly contacts the bezel along the sides of the speaker, in order to resist vibration of the speaker during use.

Although the preferred sound admitting portions of the bezel have been disclosed as comprising two large openings 22, each sound-admitting portion could instead comprise a series of smaller openings.

It will be appreciated that in accordance with the present invention, the speakers can be easily installed without the need for screws. Furthermore, the mating of the locator pins and locator holes ensures that the speaker will be properly oriented relative to its respective opening 22. Also, the pressure between the speaker and the ribs 52 of the bezel serves to minimize vibration of the speaker.

Furthermore, the snap arms 34 have been configured so as to enable the bezel to be easily molded, without the need for lifters. In that regard, in molding operations in general, such as injection molding operations, there is typically employed a primary mold comprising a pair of steels or mold halves that move towards each other along a primary axis until various parts of the steels come into contact and establish a mold cavity. After the hot plastic is injected, the steels are pulled apart to release the molded part having the desired structural features. Because of the geometry of the steels, only features of the part which can be defined along the primary axis can be molded using the steels alone.

To include a feature such as a hole or depression that is not defined along this primary axis, the mold designer must use a "lifter" in the mold cavity, i.e., a piece of steel which is inserted from some appropriate angle to form the desired feature. The "appropriate" angle is often perpendicular to the primary axis, but could be another angle if desired. After molding a part, the lifter can be pulled away along its own axis before the part is released along the primary axis. Although the use of lifters during injection molding operations is conventional, it increases the complexity and cost of the molding operation.

The snap arms 34, by virtue of including portions 36, 38 oriented substantially perpendicular to the plane of the bezel, i.e., along the primary axis of the mold, enable the bezel to be injection molded integrally with the bezel, without the need for lifters. That is, the part is injection molded within a mold cavity formed by two mold halves M, M' without the need for lifters, as shown in FIG. 9.

It will be appreciated from the foregoing that the present invention provides a novel bezel which facilitates the mounting of speakers. The speakers can simply be snapped in place, thereby eliminating the need for screws. Precision positioning is automatically achieved by the location pins, and the contact between the speakers and ribs opposes speaker vibration. Moreover, the bezel and snap arms can be injection molded of one piece due the particular orientation of the snap arms which accommodates such a molding procedure.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. In combination, an appliance having a housing, and a speaker mounted to said housing, said housing including a section having a sound-admitting portion including an opening extending from an outer side to an inner side of said housing section; said inner side including a fulcrum structure disposed adjacent one section of said sound-admitting portion, and a snap arm disposed adjacent another section of said sound-admitting portion; said snap arm including a main portion projecting away from said inner side of said housing section, and a locking finger projecting toward said inner side from an end of said main portion and arranged to form a contact surface facing generally away from said inner surface; said snap arm being elastically flexible toward and away from a center axis of said opening of said sound-admitting portion;

said speaker including a base having a first edge mountable on said fulcrum structure to form a fulcrum about which an opposite edge of said base can pivot toward and away from said inner surface; said base being engageable with said contact surface of said snap arm to elastically deflect said snap arm during travel of said opposite edge toward said housing section.

2. The combination according to claim 1 wherein said snap arm is located opposite said fulcrum section.

3. The combination according to claim 1 wherein said snap arm is of one-piece molded construction with said housing section; said housing section and snap arm formed of plastic.

4. The combination according to claim 3 wherein said housing section includes locator pins projecting from said inner side, said speaker including locator holes for receiving said locator pins.

5. The combination according to claim 4 wherein said housing section includes elongated ribs extending from said inner side, said speaker abutting said ribs.

6. The combination according to claim 1 wherein said housing section includes locator pins projecting from said inner side, said speaker including locator holes for receiving said locator pins.

7. The combination according to claim 1 wherein said housing section includes elongated ribs extending from said inner side, said speaker abutting said ribs.

8. The combination according to claim 7 wherein said snap arm is of one-piece molded construction with said housing section; said housing section and snap arm formed of plastic.

9. The combination according to claim 1 wherein said appliance is a personal computer, said housing section comprising a front bezel which frames a monitor screen of said computer.

10. The combination according to claim 1 wherein there are two said openings, and a fulcrum structure and snap arm for each opening, and a speaker mounted at each sound-admitting portion.

11. The combination according to claim 1 wherein said fulcrum structure comprises a notch.

12. A housing section for an appliance, comprising a plastic body which includes:

a sound-admitting portion including an opening extending from an outer side to an inner side of said body;

a flexible snap arm disposed adjacent said sound-admitting portion, said snap arm including a main portion projecting away from said inner side, and a locking finger projecting toward said inner side from an end of said main portion, said locking finger including a contact surface facing generally away from said inner surface enabling said snap arm to be elastically flexed toward and away from a center axis of said opening of said sound-admitting portion, said snap arm adapted to secure a speaker to said body.

13. The housing section according to claim 12 wherein said body further includes a notch disposed adjacent said sound-admitting portion for receiving an edge of a speaker.

14. The housing section according to claim 12 wherein said body and snap arm are of one-piece molded construction.

15. The housing section according to claim 12 wherein said body includes locator pins projecting from said inner side.

16. The housing section according to claim 12 wherein said body includes ribs disposed on said inner side and extending adjacent respective edges of said sound-admitting portion.

* * * * *